United States Patent Office 3,775,333
Patented Nov. 27, 1973

3,775,333
N-ACYL AZOLINONES AS PEROXYGEN BLEACH ACTIVATORS
Frank Fred Loffelman, Somerville, and Robert Edward Misner, Piscataway, N.J., assignors to American Cyanamid Company, Stamford, Conn.
No Drawing. Filed June 30, 1972, Ser. No. 267,839
Int. Cl. C11d 7/54
U.S. Cl. 252—99     10 Claims

ABSTRACT OF THE DISCLOSURE

N-acyl azolinone compounds having a formula selected from (I) 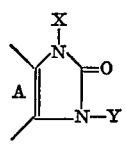

(II) 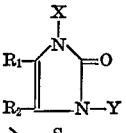

(III) 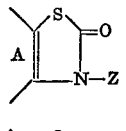

and
(IV) 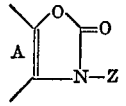

wherein:

A represents a completed benzene or naphthalene ring system which may carry a substituent selected from alkyl, alkoxy, halo, nitro, cyano and acetamido;

X represents hydrogen, acetyl, propionyl, benzoyl, cinnamoyl, phenylsulfonyl or 2-furoyl;

Y represents acetyl, propionyl, benzoyl, cinnamoyl, phenylsulfonyl or 2-furoyl;

Z may be the same as Y or a radical selected from

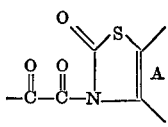

and

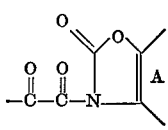

radicals; and $R_1$ and $R_2$ individually represent hydrogen, alkyl or phenyl; are effective as bleach activators in bleaching compositions comprising hydrogen peroxide or a hydrogen peroxide-releasing compound. The activated bleaching compositions are useful for various bleach applications, including fabrics, particularly when incorporated in detergent laundering compositions in which they show good storage stability and high effectiveness at low (50–70° C.) temperature.

---

This invention relates to bleaching composition. More particularly, it relates to an improved bleaching composition comprising hydrogen peroxide or a hydrogen peroxide-releasing compound, such as an organic peroxide or an inorganic peroxygen salt, and as an activator for the hydrogen peroxide-releasing compound, an azolinone compound having a formula selected from:

(I) 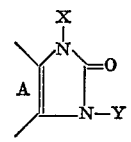

(II) 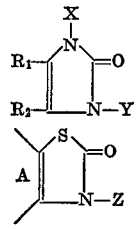

(III) 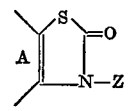

and
(IV) 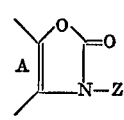

wherein:

A represents a completed benzene or naphthalene ring system which may carry a substituent selected from alkyl, alkoxy, halo, nitro, cyano and acetamido;

X represents hydrogen, acetyl, propionyl, benzoyl, cinnamoyl, phenylsulfonyl or 2-furoyl;

Y represents acetyl, propionyl, benzoyl, cinnamoyl, phenylsulfonyl or 2-furoyl;

Z may be the same as Y or a radical selected from

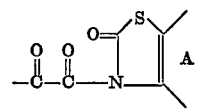

and

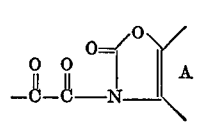

radicals; and $R_1$ and $R_2$ individually represent hydrogen, alkyl or phenyl.

The use of various N-acyl compounds as peroxygen bleach activators has previously been disclosed. For example, French Pat. 1,583,330 discloses the use of N-acyl derivatives of imidazole, pyrazole and triazole, and British Pat. 1,046,251 discloses the use of N-acyl derivatives of pyridazine, triazole and pyrazole as peroxygen salt activators in bleaching compositions for textile materials. Thus, perborate bleaching compositions containing such activators will remove a greater percentage of tea stain from a textile material than the same compositions without the activator.

However, many peroxygen bleaching compositions containing such activators have not proved satisfactory for one or more reasons, such as inadequate bleaching at 50° to 70° C., the typical working temperature range of modern laundry washing machines, or because the activators tend to deteriorate and lose their effectiveness in the time interval between manufacture and actual use of the bleaching compositions. Thus, commercial bleach compositions are often subject to storage for considerable periods of time in the warehouse or on the supermarket shelf before consumer use, and to be satisfactory, their activity must be maintained without appreciable loss during this period.

In accordance with the present invention, it has now been found that certain N-acyl derivatives of azolinone compounds, defined by Formulas I–IV (above) are superior activators for peroxygen bleaching compositions. Thus, bleaching compositions made with these activators exhibit good bleaching effectiveness at the relatively low temperature of about 50° to 70° C. Also, because of the good storage stability of the activators themselves, the bleaching compositions may be stored for surprisingly long periods of time without suffering significant loss in activity. Furthermore, the compositions are safer for all fabrics than conventional chlorine-containing bleaches.

A preferred activator of the invention is 2-benzoyl-2-benzothiazolinone:

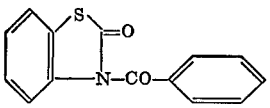

As shown in Example 6 (below), a perborate bleaching composition containing this compound as activator removes almost three times as much of the tea stain from textile as the same bleaching composition in which the activator is omitted. Furthermore, as illustrated in Example 40 (below), a bleaching formulation containing this activator maintains 100% of its effectiveness after one month's storage in an open container.

The novel bleach activators of this invention can be prepared by well-known methods. Thus, 2-benzimidazolinone can be prepared by ring-closure of o-phenylenediamine with urea according to the reaction:

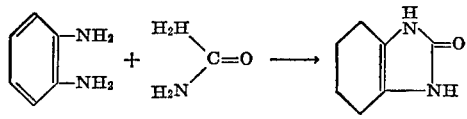

Phosgene can be used in place of urea to give the same result.

Similarly, 2-benzothiazolinone and 2-benzoxazolinone can be prepared by reaction of urea or phosgene with o-aminobenzenethiol or o-aminophenol respectively.

The corresponding naphthimidazolinone, naphthothiazolinone and naphthoxazolinone compounds can be prepared similarly from the appropriately corresponding naphthalene starting materials.

2-imidazolinone and its substitution products such as that in Example 5 are prepared readily by standard methods like that of Org. Syn. Coll., vol. 2, 1948, 231.

The azolinone compounds are readily acylated with agents such as acid halides or acid anhydrides to produce the N-acylazolinones which are the bleach activators of the invention.

Typical intermediates which might be ring-closed by reaction with ure or phosgene to give substitution products of 2-benzimidazolinone include:

4-chloro-o-phenylenediamine
4-nitro-o-phenylenediamine
4,5-dichloro-o-phenylenediamine
4-bromo-o-phenylenediamine
4-methyl-o-phenylenediamine
4,5-dimethyl-o-phenylenediamine
4-fluoro-o-phenylenediamine
4-cyano-o-phenylenediamine
4-ethyl-o-phenylenediamine
4,5-dimethoxy-o-phenylenediamine Typical intermediates which might be ring-closed by reaction with urea or phosgene to give substitution products of 2-benzothiazolinone include:

2-amino-4-methylbenzenethiol
2-amino-5-chlorobenzenethiol
2-amino-4-cyanobenzenethiol
2-amino-5-acetamidobenzenethiol
2-amino-4-nitrobenzenethiol
2-amino-4,5-dimethoxybenzenethiol Typical intermediates which might be ring-closed by reaction with urea or phosgene to give substitution products of 2-benzoxazolinone include:

2-amino-4-cyanophenol
2-amino-5-ethylphenol
2-amino-4,5-dichlorophenol
2-amino-4-fluorophenol
2-amino-5-nitrophenol
2-amino-4,5-diacetamidophenol Typical acylating agents that can be used in this invention include: acetyl chloride, acetic anhydride, propionyl chloride, propionic anhydride, butyryl chloride, butyric anhydride, oxalyl chloride, benzoyl chloride, benzoic anhydride, p-chlorobenzoyl chloride, cinnamoyl chloride, benzenesulfonyl chloride, p-toluenesulfonyl chloride, 2-naphthoyl chloride, picolinoyl chloride, 2-furoyl chloride, acryloyl chloride and the like.

The bleaching compositions of the invention contain the N-acylazolinone activating compound and the hydrogen peroxide-releasing compound in a molar ratio ranging from about 4:1 to about 1:4, the preferred ratio being about 3:2. Although higher amounts of the activator may be used, such use would be uneconomical since no advantage in terms of bleaching activity would be attained thereby.

The oxygen bleaches useful in these bleaching compositions are hydrogen peroxide and organic peroxides and inorganic peroxygen salts that liberate hydrogen peroxide in water. Examples of organic peroxide bleaching compounds are urea peroxide, benzoyl peroxide, methyl ethyl ketone peroxide, and the like. Examples of inorganic peroxygen bleaching compounds are alkali metal perborates, percarbonates, perphosphates, persulfates, monopersulfates, and the like. Mixtures of two or more bleaching compounds can, of course, be used if desired. Similarly, two or more activators can be used in combination, if desired. While, therefore, peroxide-releasing compounds in general may be used in the compositions of the invention, the preferred compounds are sodium perborate (for economic considerations) and sodium percarbonate (for ecological considerations).

The activated bleach compositions of the invention are useful for bleach applications for various substrates including fabrics, particularly when incorporated in detergent compositions for household or commercial laundering purposes. An important property of the compositions in this regard is their ability to remove stains including food stains, such as those of coffee and tea, while maintaining the purity of white in uncolored textiles.

The detergent component of the activated bleach compositions may be any of the conventional types such as anionic, cationic, nonionic or amphoteric. Examples of typically suitable anionic detergents include the alkali metal or alkaline earth metal salts of higher alkylbenzene sulfonates, olefin sulfonates, higher alkyl sulfates and higher fatty acid monoglyceride sulfates. Typical cationic detergents include tetraalkyl ammonium salts in which one of the alkyl groups contains approximately 12 to 18 carbons such as dodecyltrimethylammonium chloride or ethyldimethyloctadecylammonium methosulfate.

Typical nonionic detergents include polyglycol ethers of alkanol amides of higher fatty acids and also polyglycol ethers of higher alkanols and higher fatty acids. Amphoteric detergents include, for example, aminofatty acids such as dimethylaminopropionic acid and iminodifatty acids such as methyliminodilauric acid.

The compositions of the invention are also useful for their germicidal properties in various applications for control of microbial growth. Application may be made to any surface or substrate where such control is desired. The treatment of swimming pool water and swimming pool surfaces with the compositions of the invention is especially efficacious since the usually lower temperatures of these environments prevent effective use of other antimicrobial agents. A related utility is the treatment of water supplies to render the same fit for human consumption or for industrial use, such as the sanitization of field water for consumption by military personnel or the treatment of industrial process water so it can be reused in industrial processes or by the surrounding community. The compositions also may be employed in admixture with detergents for use as home or industrial germicidal detergents.

The following examples will serve to illustrate the invention.

EXAMPLE 1

Preparation of 5-methyl-2-benzimidazolinone

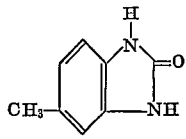

A mixture of 12.2 grams (0.10 mole) of toluene-3,4-diamine and 6.6 grams (0.11 mole) of urea is heated with stirring over an oil bath at 140° C. When the molten mass solidifies, it is cooled and extracted with 200 ml. of 1.25 N sodium hydroxide solution. The extract is acidified with concentrated HCl and the resultant solid product collected by filtration. Yield=6.3 grams (55.3% of theory). On recrystallization from ethyl alcohol, the product shows a melting point of 295–296° C.

EXAMPLE 2

Preparation of 1,3-diacetyl-2-benzimidazolinone

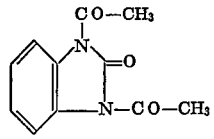

A suspension of 25.0 grams (0.187 mole) of 2-benzimidazolinone (prepared by a procedure similar to that of Example 1) in 120 ml. of acetic anhydride is heated at reflux for an hour. The solution is cooled to about 60° C., 250 ml. of water added and refluxing resumed for 10 minutes to destroy any remaining acetic anhydride. The reaction mass is cooled to about 5° C., and the product collected by filtration. Yield=39.0 grams (95.9% of theory). Recrystallization from ethyl alcohol gives a purified product of M.P. 146–148° C.

EXAMPLE 3

Preparation of 1,3-diacetyl-5-methyl-2-benzimidazolinone

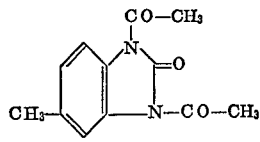

A suspension of 3.5 grams (0.024 mole) of 5-methyl-2-benzimidazolinone in 50 ml. of acetic anhydride is heated to reflux. Within 30 minutes solution is complete, but refluxing is continued an additional hour. The solution is then cooled to about 50° C., 20 ml. of water added and refluxing resumed for ten minutes to destroy any remaining acid anhydride. The reaction mass is poured over 100 grams of ice and the white precipitate collected by filtration. Yield=4.2 grams (77% of theory). Recrystallization from methanol gives white needles, M.P. 173–174° C.

EXAMPLE 4

Preparation of 3-benzoyl-2-benzothiazolinone

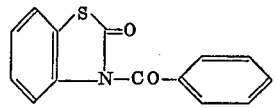

15.1 grams (0.10 mole) of 2-benzothiazolinone is dissolved in 100 ml. of pyridine (dried over NaOH) and with stirring cooled to 0° C. in an ice salt bath. To this is added a chilled mixture of 15.6 grams (0.11 mole) of benzoyl chloride and 50 ml. of pyridine. After stirring the reaction mass at 0° C. for one hour, the temperature is allowed to rise to room temperature and the stirring continued for 17 hours. A mixture of ice and water is then added to precipitate the product which is collected by filtration and oven dried. Yield=22.3 grams (87% of theory). Recrystallization from petroleum ether gives tiny white needles, M.P. 94–96° C.

EXAMPLE 5

Preparation of 1-acetyl-4,5-diphenyl-4-imidazolin-2-one

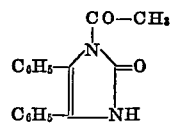

A mixture of 13.9 grams (0.006 mole) of 4,5-diphenyl-3-imidazolin-2-one (Org. Syn. Coll., vol. 2, 1948, 231), 23.4 grams (0.30 mole) acetyl chloride and 30.3 grams (0.30 mole) of triethylamine in 250 ml. of benzene is refluxed with stirring for about 17 hours. The reaction mass is filtered hot and the filtrate cooled to yield crystals which after recrystallization from ethanol melt at 189–192° C.

EXAMPLE 6

Evaluation of 3-benzoyl-2-benzothiazolinone as bleach activator

A dry oxygen bleaching composition is prepared by mixing 3-benzoyl-2-benzothiazolinone (prepared as in Example 4) with sodium perborate in a molar ratio of 3:2, and the bleaching effectiveness of this composition determined by the following test procedure: Five-gram swatches of desized, 80 x 80 cotton fabric are stained with tea in the following manner. Five tea bags are placed in one liter of water and boiled for five minutes. Thereafter, the swatches are immersed in the tea and the boiling is continued for another five minutes. The swatches are then wrung out, dried at 200–215° F., rinsed in cold water and again dried.

Two of the stained cotton swatches are placed in a stainless steel Terg-O-Tometer, a test washing machine, manufactured by U.S. Testing Company and used in the detergent trade for evaluation purposes. Forty grams of unstained cotton fabric and one liter of distilled water at 120° F. are then added so as to provide a typical household washing machine water to cloth ratio of about 20:1. There are then added 2.0 grams of "Tide" (an anionic alkylaryl sulfonate type detergent), 0.33 gram of sodium perborate and 0.76 gram of 3-benzoyl-2-benzothiazolinone. The Terg-O-Tometer is operated at 100 cycles per minute for fifteen minutes at a temperature of 122° F. The swatches are then removed, rinsed with cold water, and dried at room temperature.

Reflectance readings on the swatches are taken both before and after laundering using a Hunter Model 25-M Reflectometer with a blue filter. The swatches are backed with a white porcelain plate and read once on each side. Fluorescent effect is excluded from all readings.

The reflectance readings are averaged and the percent stain removal is obtained in accordance with the following formula in which R is the symbol for Reflectance:

Total percent stain removal
$$= \frac{R(bleached) - R(stained) \times 100}{R(unstained) - R(stained)}$$

Thes test results showed that the bleaching composition removed an average of 85% of the stain from the swatches, whereas tests conducted on the stained swatches by the same procedure, except that no activator for the perborate was used, resulted in the removal of only about 30% of the stain. Similar results are obtained if "All" (a non-ionic detergent) is used in place of "Tide."

EXAMPLES 7–36

Evaluation of N-acylazolinones as bleach activators

A series of bleaching compositions (Examples 7–36) using various N-acyl azolinone compounds of the invention were prepared and tested according to the procedure described in Example 6. In each case, the laundering bath contained 2.0 grams of "Tide," 0.33 gram of sodium perborate and the indicated amount of the named activator compound per liter of solution. The test results are in Table I. It will be seen that in each case the presence of the activator compound substantially increased the percentage of stain removal over the 30% provided when no activator was used.

TABLE I

| Example No. | Bleach activator | M.P., °C. | Grams activator[1] | Percent stain removed |
|---|---|---|---|---|
| 7 | (benzimidazolinone with N-CO-CH₃ and N-CO-CH₃) | 146–148 | 0.66 | 79 |
| 8 | (benzimidazolinone with N-CO-C₆H₅ and N-CO-C₆H₅) | 213–215 | 1.04 | 47.5 |
| 9 | (benzimidazolinone with N-H and N-CO-CH₃) | 217–219 | 0.53 | 60.7 |
| 10 | (5-Cl benzimidazolinone with N-CO-CH₃ and N-CO-CH₃) | 167–168.5 | 0.76 | 60.2 |
| 11 | (5-O₂N benzimidazolinone with N-CO-CH₃ and N-CO-CH₃) | 131–132 | 0.78 | 83.4 |
| 12 | (5,6-diCl benzimidazolinone with N-CO-CH₃ and N-CO-CH₃) | 218–219 | 0.87 | 52.8 |
| 13 | (5-H₃C benzimidazolinone with N-CO-CH₃ and N-CO-CH₃) | 173–174 | 0.70 | 76.7 |
| 14 | (5,6-diH₃C benzimidazolinone with N-CO-CH₃ and N-CO-CH₃) | 174–175 | 0.75 | 59.5 |
| 15 | (5-CH₃O benzimidazolinone with N-CO-CH₃ and N-CO-CH₃) | 160–161.5 | 0.75 | 80.3 |
| 16 | (benzimidazolinone with N-CO-C₂H₅ and N-CO-C₂H₅) | 167–168 | 0.75 | 63.2 |

TABLE I—Continued
| Example No. | Bleach activator | M.P., °C. | Grams activator[1] | Percent stain removed |
|---|---|---|---|---|
| 17 | 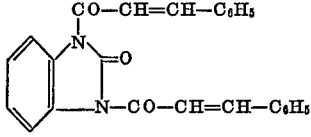 | 179–180 | 1.2 | 35.0 |
| 18 | 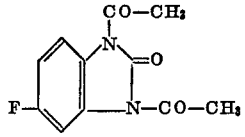 | 113–114 | 0.71 | 70.2 |
| 19 | 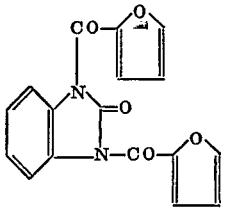 | 209–211 | 0.96 | 54.0 |
| 20 | 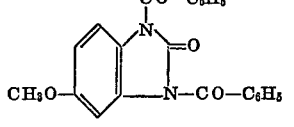 | 202–203 | 1.1 | 43.5 |
| 21 | 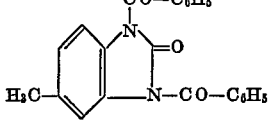 | 211–212 | 1.0 | 43.5 |
| 22 | 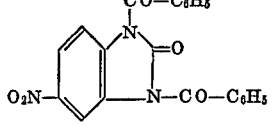 | 194–196 | 1.1 | 42.0 |
| 23 | 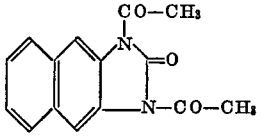 | 268–269 (d.) | 0.73 | 43.8 |
| 24 | 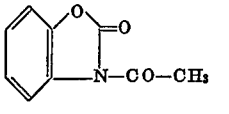 | 92–93 | 0.53 | 58.6 |
| 25 | 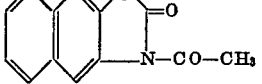 | 123–124.5 | 0.69 | 48.4 |
| 26 | 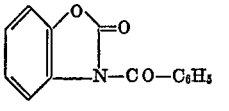 | 173–174 | 0.72 | 60.3 |
| 27 | 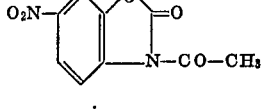 | 182–184 | 0.67 | 59.5 |
| 28 | 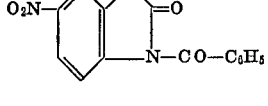 | 186–187.5 | 0.85 | 56.9 |

TABLE I—Continued

| Example No. | Bleach activator | M.P., °C. | Grams activator[1] | Percent stain removed |
|---|---|---|---|---|
| 29 | 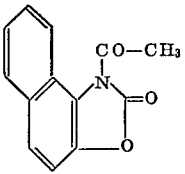 | 119-121 | 0.69 | 38.9 |
| 30 | 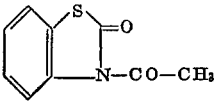 | 58-60 | 0.60 | 68 |
| 31 | 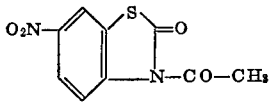 | 153-154 | 0.72 | 75.5 |
| 32 | 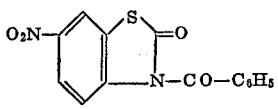 | 140-141 | 0.90 | 50.2 |
| 33 | 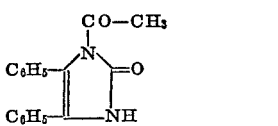 | 189-192 | 0.84 | 57.2 |
| 34 | 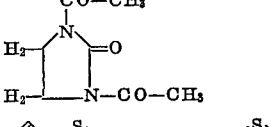 | 120-123 | 0.51 | 41.0 |
| 35 | 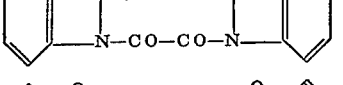 | 260-262 | 1.00 | 34.4 |
| 36 | 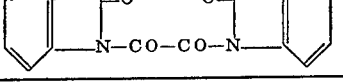 | 252-254 | 0.97 | 43.2 |

[1] Per 2 grams "Tide" and 0.33 gram sodium perborate per liter.

EXAMPLES 37-39

A further series of bleaching compositions (Examples 37-39) were prepared and tested according to the procedure described in Example 6, except that in these compositions the peroxygen bleaching compound used was sodium percarbonate. In each case, the laundering bath contained 2 grams of "Tide," 0.35 gram of sodium percarbonate and the indicated amount of the named activator compound per liter of solution. The results of these tests are given in Table II.

Here again, it is seen that the activator compounds markedly improve the percentage of stain removal over that provided by the bleaching composition without the activator (i.e., 30%).

TABLE II

| Example No. | Bleach activator | Grams activator[1] | Percent stain removed |
|---|---|---|---|
| 37 | 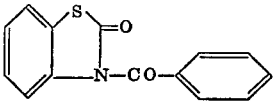 | 0.76 | 85.9 |
| 38 | 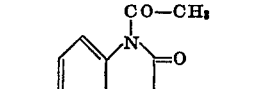 | 0.70 | 60.8 |
| 39 | 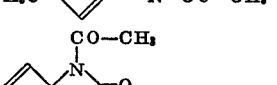 | 0.65 | 83.4 |

[1] Per 2 grams "Tide" and 0.35 gram sodium percarbonate per liter

EXAMPLE 40

Storage stability of 3-benzoyl-2-benzothiazolinone

The storage stability of 3-benzoyl-2-benzothiazolinone in a bleaching composition is shown by the bleaching effectiveness of formulated bleaching compositions containing it after storage for one month in (a) a sealed container and (b) in an open container at 80° F. and 80% relative humidity. The stain removal test procedure is the same as that described in Example 6. The test results are given in Table II.

TABLE III

| Composition | | Percent stain removed |
|---|---|---|
| 2.0 gms./liter "Tide" 0.33 gm./liter sodium perborate, no activator | Control—freshly prepared | 22.9 |
| 2.0 gms./liter "Tide", 0.33 gm./liter sodium perborate, 0.75 gm./liter 3-benzoyl-2-benzothiazolinone | Freshly prepared | 77.5 |
| Do | Stored one month in a closed container | a 78.9 |
| Do | Stored one month in an open container 80° F., 80% rel. hum. | 77.5 | a Within experimental error.

As shown in Table III, the 3-benzoyl-2-benzothiazolinone maintains 100% of its effectiveness after one month's storage in either an open or closed container.

We claim:

1. An activated bleaching composition consisting essentially of (a) a bleaching agent selected from hydrogen peroxide and a hydrogen peroxide-releasing compound and (b) an activating amount of an azolinone compound having a formula selected from:

(I) 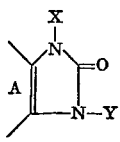

(II) 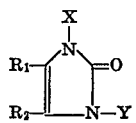

(III) 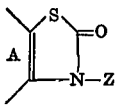

and (IV) 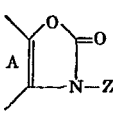

wherein:
A represents a completed benzene or naphthalene ring system which may carry a substituent selected from lower alkyl, lower alkoxy, halo, nitro, cyano and acetamido;
X represents hydrogen, acetyl, propionyl, benzoyl, cinnamoyl, phenylsulfonyl or 2-furoyl;
Y represents acetyl, propionyl, benzoyl, cinnamoyl, phenylsulfonyl or 2-furoyl;
Z may be the same as Y or a radical selected from

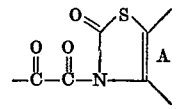

and

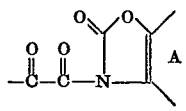

radicals; and
$R_1$ and $R_2$ individually represent hydrogen, lower alkyl or phenyl.

2. A composition according to claim 1 wherein the bleaching agent is a hydrogen peroxide-releasing compound.

3. A composition according to claim 2 wherein the mole ratio of the azolinone compound to the hydrogen peroxide-releasing compound is from about 1:4 to about 4:1.

4. A composition according to claim 2 wherein the hydrogen peroxide releasing compound is sodium perborate or sodium percarbonate.

5. A composition according to claim 4 wherein the azolinone compound is 3-benzoyl-2-benzothiazolinone.

6. A composition according to claim 4 wherein the azolinone compound is 1,3-diacetyl-5-methyl-2-benzimidazolinone.

7. A composition according to claim 4 wherein the azolinone compound is 1,3-diacetyl-2-benzimidazolinone.

8. A composition according to claim 4 wherein the azolinone compound is 1,3-diacetyl-5-nitro-2-benzimidazolinone.

9. A composition according to claim 4 wherein the azolinone compound is 1,3 - diacetyl-5-methoxy-2-benzimidazolinone.

10. A composition according to claim 1 containing a organic detergent.

References Cited

UNITED STATES PATENTS

| | | | |
|---|---|---|---|
| 3,349,035 | 10/1967 | Dithmar | 252—186 |
| 3,405,136 | 10/1967 | Wright | 252—186 |
| 3,640,874 | 2/1972 | Gray | 252—186 |
| 3,650,963 | 3/1972 | Werdshausen et al. | 252—186 |
| 3,650,962 | 3/1972 | Werdshausen et al. | 252—186 |
| 3,655,567 | 4/1972 | Gray | 252—186 |

MAYER WEINBLATT, Primary Examiner

I. GLUCK, Assistant Examiner

U.S. Cl. X.R.

8—111; 252—102, 186; 423—272